United States Patent [19]
Yang

[11] Patent Number: 5,123,299
[45] Date of Patent: Jun. 23, 1992

[54] GEAR BOX OF AIR FAN

[76] Inventor: Kun-Yuan Yang, c/o Hung Hsien Patent Service Center, P.O. Box 55-1670, Taipei (10477), Taiwan

[21] Appl. No.: 767,696
[22] Filed: Sep. 30, 1991
[51] Int. Cl.⁵ .............................................. F16H 57/02
[52] U.S. Cl. ................................................. 74/606 R
[58] Field of Search ........................ 74/606 R; 29/464; 416/100

[56] References Cited

U.S. PATENT DOCUMENTS 3,363,477  1/1968  Curtiss et al. ................... 74/606 R Primary Examiner—Richard Lorence
Assistant Examiner—William O. Trousdell

[57] ABSTRACT

A gear box for storing gears of a swinging controller of an air fan in the gear box includes an upper cover fixed on the gear box and integrally formed by plastic molding process to form two screw holes in situ in the upper cover for saving a manual drilling and tapping operation so that an outer housing may be secured on the gear box by a screw inserted into one of the two screw holes formed in the upper cover for encasing the gear box and a fan motor inside the housing.

4 Claims, 3 Drawing Sheets

GEAR BOX OF AIR FAN

BACKGROUND OF THE INVENTION

A conventional air fan such as a desk fan placed on a desk for blowing air for cooling purpose includes a swinging controller adjacent to a motor of the fan having a gear box provided in a rear portion of an air fan having a control lever which can be pulled upwardly for posing the fan at a fixed air blowing direction, or depressed downwardly for swinging the air fan either rightwardly or leftwardly for cooling purpose. Such a gear box provided for the swinging controller of the air fan is always made of metallic material. For securing a motor housing on the gear box for encasing the gear box and the motor within the motor housing, the metallic gear box should be first drilled with two round holes which are then tapped for forming female threads in the two round holes so that two screws may be fixed into the two threaded holes for securing the motor housing on the gear box to be fixed on a fan frame.

Drilling and tapping the two screw holes in the metallic gear box will require labor, and thereby increase production cost and reduce the competitive potential of a fan-making industry.

The present inventor has found the drawbacks of a conventional air fan and invented the present air fan provided with integrally formed gear box cover secured on the gear box.

SUMMARY OF THE INVENTION

The object of the present invention is to provide a gear box for storing gears of a swinging controller of an air fan in the gear box including an upper cover fixed on the gear box and integrally formed by plastic molding process to form two screw holes in situ in the upper cover for saving a manual drilling and tapping operation so that an outer housing may be secured on the gear box by a screw inserted into one of the two screw holes formed in the upper cover for encasing the gear box and a fan motor inside the housing.

DETAILED DESCRIPTION

Figure 1:
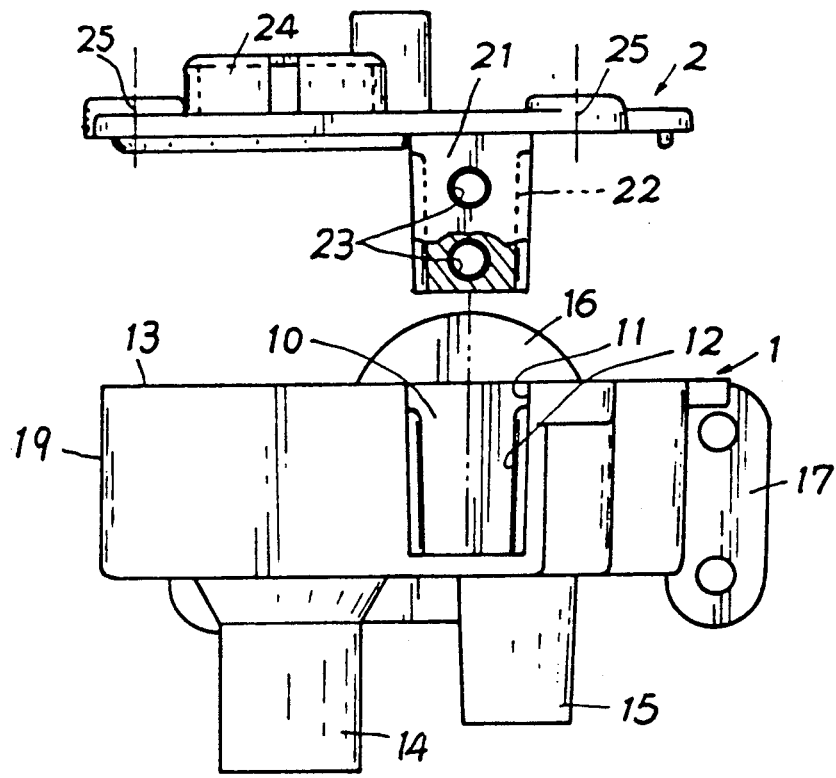
FIG. 1 is a front view of the present invention.
Figure 2:
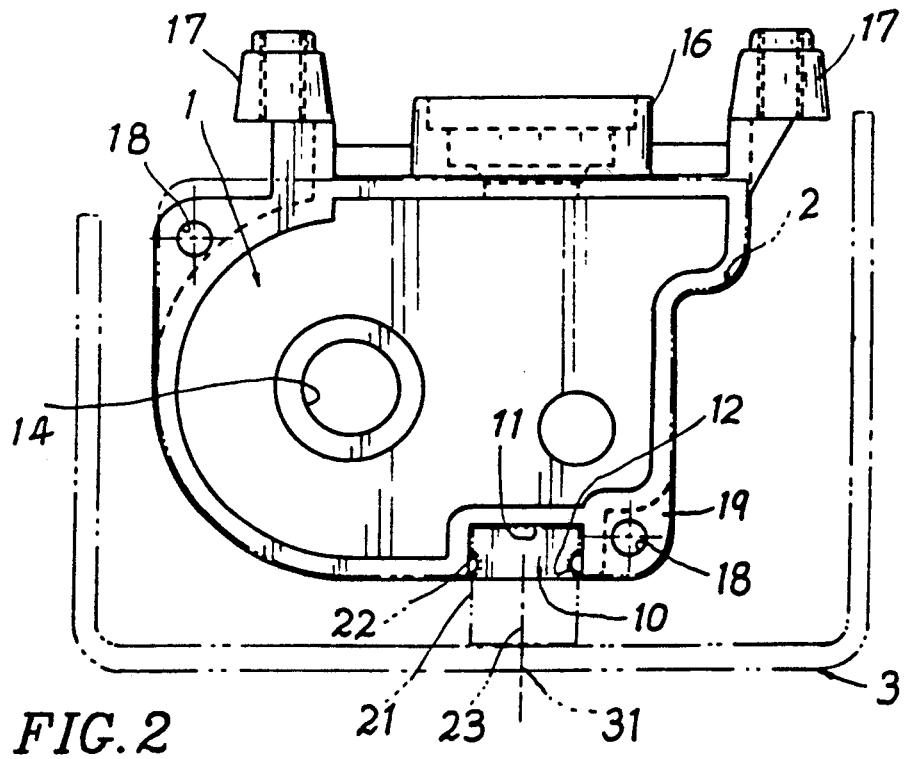
FIG. 2 is a top view illustration of the present invention when assembled.
Figure 3:
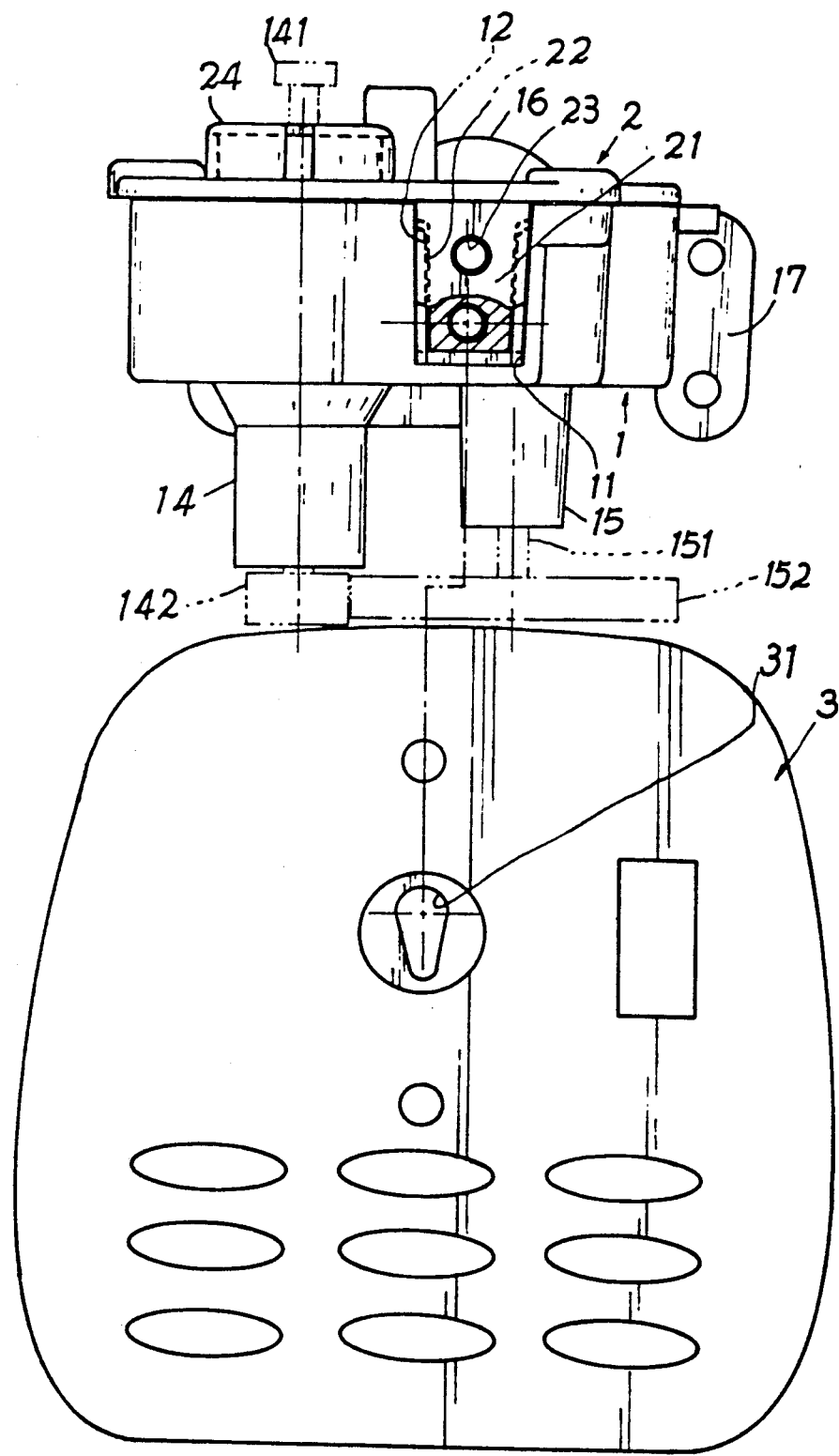
FIG. 3 is an illustration of the present invention ready for securing a motor housing thereon.

As shown in FIGS. 1, 2 and 3, a gear box of the present invention comprises: a gear-box casing 1 secured with an upper cover 2 for securing a motor housing 3 thereon for encasing the gear box and a fan motor inside the housing 3. The gear-box casing 1 may be made of metallic materials such as an aluminum alloy through casting process. The upper cover 2 is integrally formed by plastic molding process.

The gear-box casing 1 is formed with a socket 10 recessed in an outer surface of the casing 1 having a socket wall 11 circumferentially formed in the socket 10 and two longitudinal extensions 12 vertically formed on two opposite side portions of the socket wall 11 of the casing 1.

Figure 4:
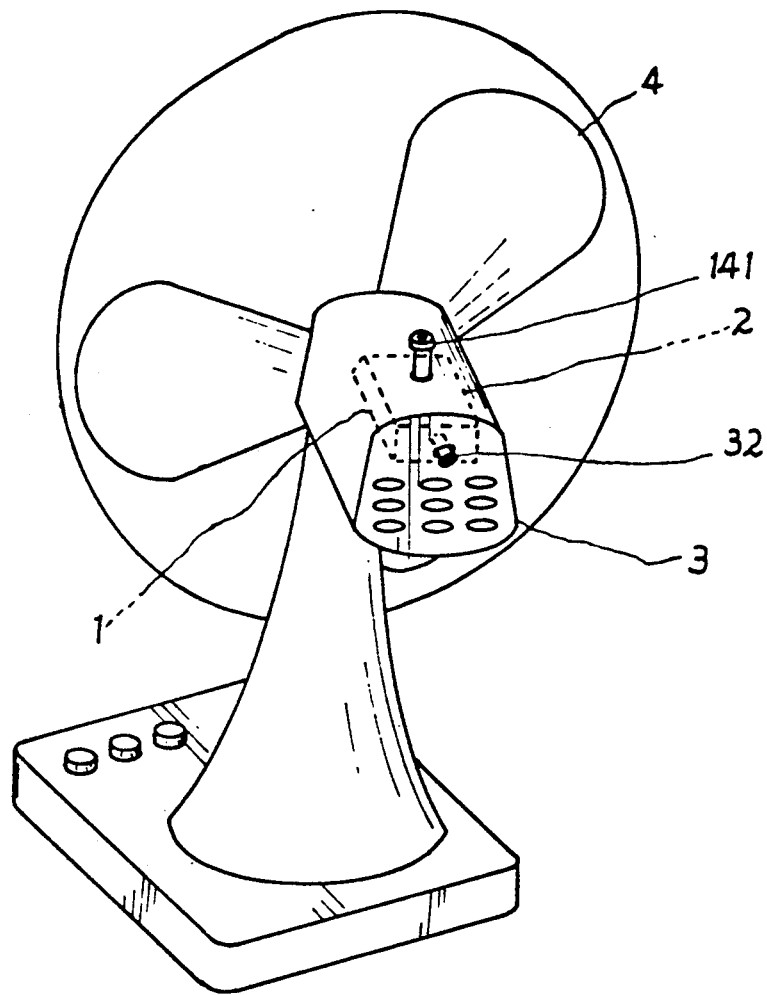
FIG. 4 is a perspective view of an air fan having the motor housing encasing the gear box of the present invention.

The casing 1 includes a lower lever sleeve 14 protruding downwardly from the casing 1 for pivotally mounting a control lever 141 of a swinging controller 141 for operatively swinging an air fan 4 as shown in FIG. 4 in one side portion of the gear box and a gear-spindle sleeve 15 protruding downwardly from the casing 1 for pivotally mounting a gear spindle 151 in the other side portion of the casing 1 having a driving wheel 152 secured on a lower portion of the gear spindle 151 engageable with a pinion 142 formed on a lower portion of the control lever 141. Upon an upward pulling of the control lever 141, the pinion 142 is disengaged from the driving gear 152 to allow the air fan to blow air at a fixed direction without being swung. Upon a downward depression of the lever 141, the gear 152 will be engaged with the pinion 142 for reciprocatively swinging the air fan. The swinging mechanism of a desk air fan is so conventional wellknown in the art so that their detailed structures are not described in detail herewith.

The casing 1 further includes: an upper casing surface 13 having a plurality of screw holes 18 vertically formed in a side wall portion 19 of the casing 1 for inserting screws therein through the other plural screw hole 25 formed in the upper cover 2 for securing the upper cover 2 on the lower casing 1; a motor-shaft sleeve 16 such as made of copper bush laterally formed in the casing for passing a motor shaft therein for driving a worm gear set (not shown) provided in the gear box to be operated by the control lever 141 which serves as a clutch for operatively swinging or fixedly posing the air fan; and a bracket 17 protruding sidewardly from the casing 1 to be secured on a motor or fan frame by screws (not shown).

The upper cover 2 sealed on an upper opening of said casing 1 includes: a protrusion plate 21 protruding downwardly from an outer portion of the cover 2 having two longitudinal grooves 22 respectively recessed in two opposite side portions of the protrusion plate 21 slidably engageable with the two longitudinal extensions 12 formed in the socket 10 of the casing 1, at least a round hole 23 integrally formed through the protrusion plate 21, and an upper lever sleeve 24 for pivotally mounting an upper portion of the control lever 141. The round holes 23 are formed in situ in the protrusion plate 21 during the molding process so as to save a drilling processing work after integrally forming the upper cover 2.

The socket wall 11 of the casing has a cross section of generally U shaped as shown in FIG. 2. The shape of the plate 21 of the cover 2 and the shape of the socket 10 of the casing 1 are preferably made as rectangular, but are not limited in this invention.

When installing the present invention, the protrusion plate 21 of the upper cover 2 is inserted into the socket 10 of the casing 1 by engaging the extensions 12 of the casing 1 with the groovesd 22 of the protrusion plate 21 of the upper cover 2 and a plurality of screws are further inserted into the screw hole 25, 18 formed in the cover 2 and the casing 1, the upper cover 2 will be firmly secured on the casing 1. The motor housing 3 as shown in FIG. 3 will then be secured on the gear box of the present invention by fixing a metal screw or bolt 32 through the fixing hole 31 formed in a rear portion of the housing 3 and through anyone hole of the round holes 23 formed in the cover 2 which is already fixed on the gear-box casing 1. During the insertion of the screw or bolt 32 as shown in FIG. 4, a male-threaded portion on the screw or bolt 32 will form a female-threaded porition in situ in the round hole 23 for securing the screw or bolt 32 in the hole 23 for firmly securing the housing 3 on the cover 2 and casing 1 of the gear box on the dfan frame of the air fan 4. The other hole 23 of the cover 2 is provided for securing any other element (not shown) of the swinging controller.

The present invention has the following advantages superior to a gear box of a conventional air fan:

1. There is no need to pre-drill round holes in the metallic gear box and then to tap the round hole to form female threads for the insertion of a screw for fixing a motor cover on the gear box. The round holes 23 are integrally formed in the plate 21 of the upper cover of the present invention. Since the upper cover 2 is made of plastic material, a metal screw can be rotatably inserted into the round hole 23 for securing the motor housing 3 on the gear box.

2. If the screw holes are formed on the casing 1 of the gear box as found in a conventional gear box of air fan, any product of poor quality of the gear box such as an improper drilling or tapping of the screw holes may cause a rejection of the whole set of gear box. Comparatively, if the cover 2 of this invention is formed with poor holes 23, only the cover 2 is rejected, which is still more economic than a rejection of a larger casing of the gear box.

I claim:

1. A gear box of air fan comprising: a casing having a socket recessed in an outer portion of said casing having a socket wall circumferentially formed in the socket and two longitudinal extensions vertically formed on two opposite side portions of the socket wall of said casing; and an upper cover made of plastic material having a protrusion plate protruding downwardly from an outer portion of said cover having two longitudinal grooves vertically formed and recessed in two opposite side portions of said protrusion plate slidably engageable with said two longitudinal extensions formed in said socket of said casing, and at least a round hole integrally formed through said protrusion plate when integrally forming said upper cover by a plastic molding process, whereby upon an engagement of said protrusion plate of said upper cover with said socket of said casing, said upper cover is sealed on an upper opening of said casing for forming a gear box of an air fan; and upon an insertion of a screw through a screw hole of a motor housing and the round hole of said upper cover, said motor housing is secured on said cover and said gear box for encasing said gear box and a driving motor of the air fan inside said motor housing.

2. A gear box according to claim 1, wherein said socket wall of said casing has a cross section of generally U shaped.

3. A gear box according to claim 1, wherein said protrusion plate of said upper cover is generally formed as a rectangular shape.

4. A gear box according to claim 1, wherein said round hole of said upper cover has an inside diameter slightly smaller than a diameter of said screw for firmly fixing said motor housing onto said gear box.

* * * * *